3,716,388
COLORING COMPOSITIONS
Benito Lopez, Parsippany, and Saul S. Kornblum, Springfield, N.J., assignors to Sandoz-Wander, Inc., Hanover, N.J.
No Drawing. Continuation-in-part of abandoned application Ser. No. 748,593, July 30, 1968. This application Sept. 11, 1970, Ser. No. 71,428
Int. Cl. C08h 17/66; C08k 1/24
U.S. Cl. 106—289          13 Claims

ABSTRACT OF THE DISCLOSURE

A lake dye composition of a F.D. & C., D. & C. and External D. & C., or non-certified dye adsorbed on an insoluble fumed inorganic oxide substrate, e.g., titanium dioxide. It is useful for color coating pharmaceutical, cosmetic, food and other solid forms.

---

This application is a continuation-in-part of application Ser. No. 748,593, filed July 30, 1968, now abandoned.

This invention relates to color compositions. More particularly, it relates to lake dye compositions for coloring solid forms (i.e., pharmaceutical tablets, pills and pellets, cosmetics, foods, etc.) and to methods for the preparation thereof.

Commercially available certified F.D. & C. lakes are usually produced by co-precipitation of F.D. & C. dyes with a water-insoluble, inorganic substrate. The commonly used prior art substrate is alumina.

Commercial colored titanium dioxide (USP grade) pigments are used as opaquing agents for soluble or insoluble dyes. The imbalance of electrostatic charges on the surface of titanium dioxide (USP) particles forms agglomerates which prevents significant physical or chemical interaction with the dyes. This results in a deficient pigment, having poor dispersibility and decreased optical properties, particularly undertone and tinting strength.

It is therefore an object of this invention to prepare color lake formulations comprising inorganic substrates without the prior art deficiencies. This and other objects of the invention will become apparent from the following detailed description and specific examples.

This invention provides color lake compositions comprising a finely divided, fumed inorganic oxide and a dye or combination of dyes adsorbed on the fumed oxide.

This invention also provides a process for preparing color lake compositions which comprises dispersing in water or organic solvent a finely divided water-insoluble, fumed inorganic oxide, and intimately mixing therewith a dye or combination of dyes to form a color lake.

Additional agents such as surface active agents (i.e., nonionic), a binding agent (i.e., partially hydrolyzed polyvinylacetate), and an acidifying agent (i.e., strong volatile inorganic acids such as hydrochloric acid and organic acids such as acetic, citric, tannic, etc.) may be added to the color lake compositions. By varying the particular acid used to treat the dye adsorbate different shades of specific color can be obtained.

The fumed inorganic oxides of this invention are prepared according to conventional fuming techniques and include, but are not limited to, fumed titanium dioxide (P-25 [1], Cab-O-Ti [2]), fumed alumina (aluminum oxide C [1] and Alon C [2]), and fumed silica (Cab-O-Sil [2]), fumed zirconium oxide and fumed ferric oxide.

The particle size range of the fumed inorganic oxides of this invention is from about 0.001 to about 0.040 microns. The surface area B.E.T. is from about 35 to about 400 square meters per gram.

The formation of a color lake results from the physicochemical reaction between the water or organic solvent soluble dye and the fumed inorganic oxide.

The large external surface area of the fumed inorganic oxides of this invention is physically and chemically more reactive than the prior art materials, e.g., titanium dioxide (USP). This results in strong attractive forces between the fumed inorganic oxide and the negatively charged dye particles. It is believed that the stability of the color lake compositions of this invention is due to the particle size and not the chemical composition of the oxide.

The certified F.D. & C., D. & C., and external D. & C. dyes which may be used in the practice of this invention are classified as soluble, sparingly soluble and insoluble in water. A number of dyes in the water soluble group are: e.g., F.D. & C. Red No. 2, F.D. & C. Red No. 3, F.D. & C. Yellow No. 5, F.D. & C. Yellow No. 6, F.D. & C. Green No. 3, F.D. & C. Blue No. 1, F.D. & C. Blue No. 2. In the water insoluble group of dyes are: e.g., D. & C. Orange No. 16, D. & C. Red No. 37, D. & C. Green No. 6 and D. & C. Yellow No. 11.

In addition to the certified dyes, other dyestuffs may be employed in the formation of the lake dyes, and included in this noncertified category are: Carmoisine B (Fast Red D), Ponceau 4 R (Red), Acid Yellow G (Fast Yellow), Anthraquinone Blue, Disulphine Blue, Guinea Green (previously F.D. & C. Green No. 1) and 4,5-dibromo-2,7-diiodo-3,6-fluorandiol (previously D. & C. Orange No. 16).

In a preferred embodiment of this invention a slurry is formed at ambient temperature between the fumed inorganic oxide (i.e., fumed titanium dioxide) and a solvent (e.g., ethyl alcohol). Weight ratios of fumed inorganic oxide to solvent may be from 10:1 to 1:1. The slurry is homogenized in a high speed mill (e.g. colloid mill). The certified color is added either as a solution or fine powder in an amount between 1 to 30% by weight of slurry's solids content. A suitable particle size for powder addition is from 40 to 350 mesh United States Standard. The dye is then adsorbed on the suspended fumed oxide.

Milling is continued for 5 to 30 minutes to obtain a homogeneous suspension. At this point the addition of a wetting agent may be made. The resulting suspension can either be filtered, centrifuged or spray dried to obtain the lake. Spray drying is preferred. Prior to spray drying, the suspension may be acidified or a binder added (e.g., partially hydrolyzed polyvinylacetate). This increases the substantivity of the dye for the substratum.

For use on pharmaceutical forms (i.e., tablets), the lake is suspended in an aqueous suspending medium such as maltose, lactose, glucose or sucrose syrup solution (USP grade). The resulting coloring composition can be added to tablets in a rotating coating pan.

While the lake dye of this invention is particularly applicable to pharmaceutical forms this does not preclude the use in other areas (i.e., cosmetics, foods, plastics and the like).

The lake dyes of this invention give a greater intensity of color than commercial lake dyes, when using the same ratio of dye to adsorbate.

This invention is illustrated but not limited by the following examples.

EXAMPLE I

|  | Gms. |
|---|---|
| Fumed titanium dioxide | 960 |
| F.D. & C. Violet No. 1 | 40 |

The titanium dioxide was dispersed in 200 cc. of water and homogenized. A 500 cc. aqueous solution of the dye was added to the titanium dioxide slurry and the resultant mixture milled in a colloid mill for about 30

---
[1] Degussa Inc.
[2] Godfrey L. Cabot Corp.

minutes. The resultant slurry was filtered on a filter press, washed with water and dried.

EXAMPLE II

|  | Gms. |
|---|---|
| Fumed titanium dioxide | 750 |
| F.D. & C. Red No. 3 | 200 |
| Pluronic F-68 [3] | 5.0 |

[3] Wyandotte Chemical Corp.

The titanium dioxide was dispersed in 0.7 liter of water and homogenized. A 2 liter aqueous solution of the dye was added to the titanium dioxide slurry and the resultant mixture milled in a colloid mill for about 30 minutes. A 1 liter solution of the wetting agent was added to the resultant slurry. A 1% acetic acid-ethanolic solution was simultaneously pumped with the slurry at a ratio of 1:1 into a spray dryer. The air inlet temperature in the spray dryer was 175° C. and the air outlet temperature was 75° C. The resulting material was dried overnight in a vacuum oven at 45°–50° C.

EXAMPLE III

|  | Gms. |
|---|---|
| Fumed titanium | 895 |
| F.D. & C. Blue No. 1 | 50 |
| Pluronic F-68 | 5.0 |
| Partially hydrolyzed polyvinylacetate | 50 |

The titanium dioxide was dispersed in 900 ml. of water and homogenized. A 2 liter aqueous solution of the dye was added to the titanium dioxide slurry and the resultant mixture milled in the colloid mill for about 30 minutes. A 1 liter solution of the polyvinylacetate and a 300 cc. aqueous solution of the wetting agent were added to the titanium dioxide slurry. The resulting mixture was spray dried under the conditions described in Example II.

EXAMPLE IV

|  | Gms. |
|---|---|
| Fumed titanium dioxide | 180 |
| D. & C. Orange No. 16 C.I. 45371 (4,5-dibromo-2,7-diiodo-3,6-fluorandiol) | 20 |

The titanium dioxide was dispersed in 200 cc. of water and homogenized. A 2 liter ethyl alcohol solution of the dye was added to the titanium dioxide slurry and the resulting mixture milled in a colloid mill for about 30 minutes. The resultant slurry was spray dried under the conditions described in Example II.

EXAMPLE V

|  | Gms. |
|---|---|
| Fumed alumina | 795 |
| F.D. & C. Yellow No. 5 | 200 |
| Pluronic F-68 | 5.0 |

The fumed alumina was dispersed in 0.7 liter of water and homogenized. A 2 liter aqueous solution of the dye was added to the fumed alumina slurry and the resultant mixture milled in a colloid mill for about 30 minutes. A 1 liter solution of the wetting agent was added to the resultant slurry. A 1% acetic acid-ethanolic solution was simultaneously pumped with the slurry at a ratio of 1:1 into a spray dryer. The air inlet temperature in the spray dryer was 175° C. and the air outlet temperature was 75° C. The resulting material was dried overnight in a vacuum over at 45°–50° C.

EXAMPLE VI

|  | Gms. |
|---|---|
| Fumed alumina | 795 |
| F.D. & C. Red No. 3 | 200 |
| Pluronic F-68 | 5.0 |

The fumed alumina was dispersed in 0.7 liter of water and homogenized. A 2 liter aqueous solution of the dye was added to the fumed alumina slurry and the resultant mixture milled in a colloid mill for about 30 minutes. A 1 liter solution of the wetting agent was added to the resultant slurry. A 1% acetic acid-ethanolic solution was simultaneously pumped with the slurry at a ratio of 1:1 into a spray dryer. The air inlet temperature in the spray dryer was 175° C. and the air outlet temperature was 75° C. The resulting material was dried overnight in a vacuum oven at 45°–50° C.

EXAMPLE VII

|  | Gms. |
|---|---|
| Fumed silica (Cab-O-Sil M-5) | 36 |
| F.D. & C. Violet No. 1 | 1.5 |

The fumed silicon dioxide (36.0 g.) was dispersed in 300 cc. of water and homogenized using a Waring Blendor. A 120 cc. aqueous solution of the F.D. & C. Violet No. 1 (1.5 gm.) was added to the silicon dioxide slurry and the resultant mixture milled in the Waring Blendor for about 30 minutes. The resultant slurry was filtered through a 1.2 micron millipore membrane employing vacuum, washed with water and dried.

The resulting color lakes from Examples I through VII when dispersed in water did not color the water nor give any indication that the adsorbed dye was leached from the fumed silica substrate.

EXAMPLE VIII

To illustrate the dye retention characteristics of the fumed inorganic substrates of this invention, as compared with the prior art substrates, the following compositions were prepared.

|  | Gms. |
|---|---|
| (A) Fumed titanium dioxide (Cab-O-Ti, Godfrey L. Cabot Corp.) | 36 |
| F.D. & C. Violet No. 1 | 1.5 |
| (B) Pigmentary titanium dioxide U.S.P. (Whittaker, Clark & Daniels, Inc.) | 36 |
| F.D. & C. Violet No. 1 | 1.5 |
| (C) Fumed aluminum oxide (Alon C. Godfrey L. Cabot Corp.) | 36 |
| F.D. & C. Violet No. 1 | 1.5 |
| (D) Aluminum oxide reagent grade (Merck & Co., Inc.) | 36 |
| F.D. & C. Violet No. 1 | 1.5 |

Compositions A and C are new and novel compositions of the present invention. Compositions B and D contain prior art substrates.

Each of formulations A, B, C and D were prepared as follows:

36 grams of substrate and 20 ml. of distilled water were homogenized (Waring Blendor) for 10 minutes. 1.5 grams of F.D. & C. Violet No. 1 in 50 ml. of distilled water was added to the homogenized substrate and then homogenized (Waring Blendor) for 30 minutes. The homogenized substrate and color lake was vacuum filtered through a millipore membrane (0.45 micron) and washed with distilled water until no violet color was apparent in the washings. The filtered material was then air dried.

An inspection of the filtered material showed that the color lakes of this invention (compositions A and C) retained their strong violet color while the color lakes prepared with the substrates of the prior art (compositions B and D) showed a complete inability of the substrate to retain the dye.

What is claimed is:

1. A lake dye consisting essentially of an insoluble, fumed inorganic oxide substrate having a particle size from about 0.001 to about 0.040 micron and a surface area of from about 35 to about 400 m.$^2$/gm. and a dye adsorbed on said substrate.

2. The composition according to claim 1 wherein said inorganic oxide substrate is fumed titanium dioxide.

3. The composition according to claim 1 wherein said inorganic oxide substrate is fumed alumina.

4. The composition according to claim 1 wherein said inorganic oxide substrate is fumed silica.

5. The composition according to claim 1 wherein said inorganic oxide substrate is fumed zirconium oxide.

6. The composition according to claim 1 wherein the fumed inorganic oxide substrate is fumed ferric oxide.

7. The method for preparing lake dye compositions which comprises preparing an aqueous dispersion of an inorganic, fumed oxide, a dye, and a surface active agent, subjecting said dispersion to the action of a high shearing apparatus, acidifying said sheared dispersion, and subsequently atomizing and drying said acidified dispersion.

8. The method for preparing lake dye compositions which comprises preparing an aqueous dispersion of an inorganic fumed oxide and a dye, subjecting said dispersion to the action of a high shearing apparatus and drying said dispersion.

9. The method according to claim 8 wherein the fumed oxide substrate is fumed titanium dioxide.

10. The method according to claim 8 wherein the fumed oxide substrate is fumed alumina.

11. The method according to claim 8 wherein the fumed oxide substrate is fumed silica.

12. The method according to claim 8 wherein the fumed oxide substrate is zirconium oxide.

13. The method according to claim 8 wherein the fumed oxide substrate is ferric oxide.

References Cited

UNITED STATES PATENTS

| | | | |
|---|---|---|---|
| 1,907,156 | 5/1933 | Orthner et al. | 106—289 |
| 1,978,197 | 10/1934 | Hailwood et al. | 106—289 |
| 2,238,243 | 4/1941 | Black | 106—289 |
| 3,013,889 | 12/1961 | Stepp | 106—289 |
| 3,459,572 | 8/1969 | Lee | 106—289 |
| 3,579,356 | 5/1971 | Miller et al. | 106—300 |

JAMES E. POER, Primary Examiner

U.S. Cl. X.R.

106—300, 304, 308 Q